No. 770,988. PATENTED SEPT. 27, 1904.
H. G. J. STANG.
OROGRAPH INSTRUMENT.
APPLICATION FILED APR. 7, 1904.
NO MODEL. 2 SHEETS—SHEET 1.
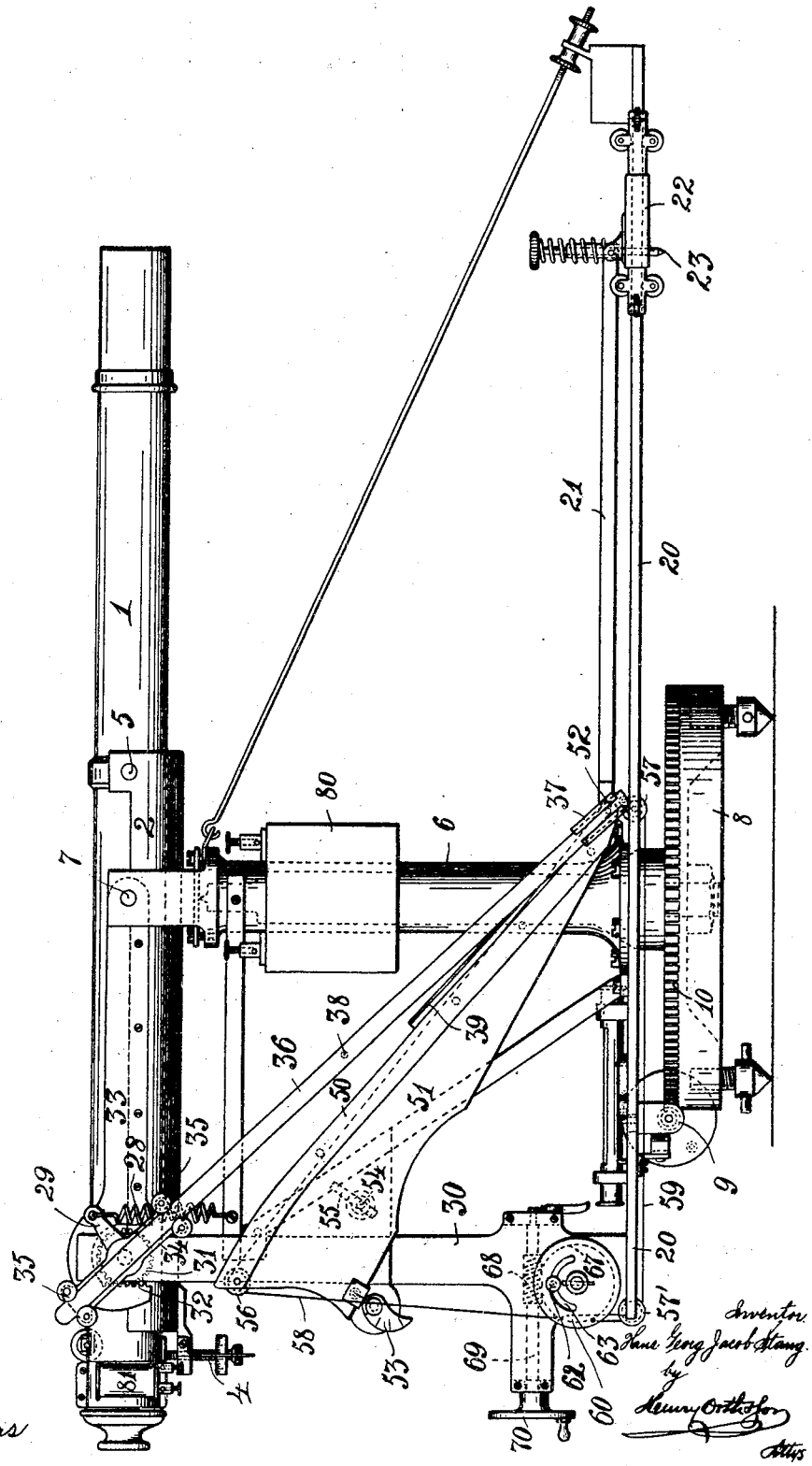

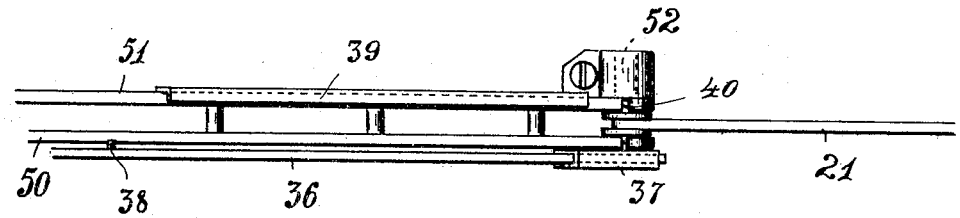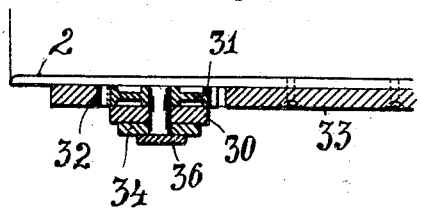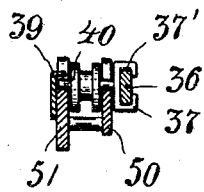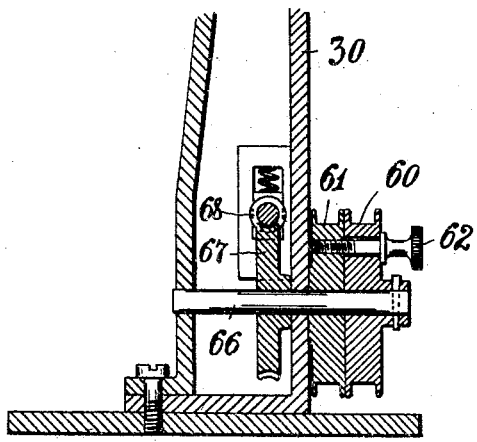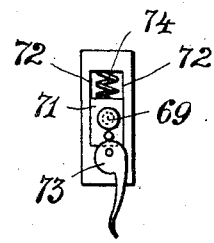

No. 770,988. Patented September 27, 1904.

UNITED STATES PATENT OFFICE.

HANS GEORG JACOB STANG, OF OSCARSBORG, NEAR DRÖBAK, NORWAY.

OROGRAPH INSTRUMENT.

SPECIFICATION forming part of Letters Patent No. 770,988, dated September 27, 1904.

Application filed April 7, 1904. Serial No. 202,115. (No model.)

*To all whom it may concern:*

Be it known that I, HANS GEORG JACOB STANG, a subject of the King of Norway and Sweden, residing at Oscarsborg, near Dröbak, Norway, have invented certain new and useful Improvements in Orograph Instruments; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to orograph instruments; and it consists in improvements upon the invention described in Letters Patent granted to me in the United States and numbered 373,206.

The object of these improvements is to facilitate the manipulation of the instrument and to make it possible to adjust the instrument for the variation in tide.

Other objects of my invention will be clearly explained hereinafter.

Figure 1 is a side view of the instrument. Figs. 2 to 5 are details on a larger scale. Fig. 2 is a plan view of the lower part of the inclined guide-rails and parts connected therewith. Fig. 2$^a$ is a horizontal section through a portion of the cradle-operating mechanism. Fig. 3 is a cross-section of the same parts. Fig. 4 is a vertical axial section through the drum arrangement. Fig. 5 is an end view of the journal arrangement for the drum-operating axle.

The general arrangement of the instrument is the same as explained in my prior patent above referred to. It is not therefore necessary to describe the instrument in a detailed way. To facilitate the explanation of my present improvements, I shall, however, first in a general way describe the main features of the instrument and its operation.

1 is the telescope, resting in a holder or cradle 2; 4, a leveling-screw, and 5 the pivot at the forward end of the cradle on which the telescope is moved when adjusting the leveling-screw.

6 is the central post carrying the telescope and other parts.

7 is the pivot at the top of the post, on which the telescope (with the cradle) is moved in a vertical plane when sighting an object.

The post 6 fits over a vertical stud fixed to the foot-plate 8 of the instrument and may be moved in a horizontal plane around this stud as pivot by means of the worm 9, which engages a toothed ring 10, fixed to the foot-plate.

The frame of the instrument consists of a horizontal arm 20, fixed at the foot of the post, and a vertical part 30, extending from the rear part of the horizontal arm 20 to the rear part of the cradle. At the top of the frame-piece 30 there is mounted a pinion 31, meshing with a toothed arc 32, formed on a bar 33, fixed to the cradle. The end of the axle of the pinion carries a cross-piece 34, on which are mounted four guide-rollers 35, between which passes a rod 36, connected at its lower end with the rod 21. The other end of the latter is connected with the index-slide 22, which is movably mounted on the horizontal framework 20, on which a scale or ruler is mounted.

50 is an incline on which the end of the rod 21 may roll or slide.

As is known from my prior patent, the operation of the instrument is as follows: In the position of parts as shown the telescope is thought to be placed horizontal. If by means of the worm 9 it has been given the required direction in the horizontal plan, it is moved vertically by moving the back end of the rod 21 upward on the incline 50. The difference in the inclination of this incline and the rod 36 will by such movement cause a rotatory movement of the pinion 31, whereby the telescope will be lifted at its rear end. When the object sighted at is observed in the telescope, its distance from the observer is given by the index, or if a map is placed underneath the index-slide the pointer 23 will show on the map the position of the object.

In the following I shall now in a more detailed manner describe the improvements forming the object of my present patent.

As mentioned, the lower end of the rod 36 and the forward end of the rod 21 are connected with each other. In the way I have done this before the result will be that when the forward end of the rod 21 is moved to the top of the incline 50 the rod 36 will project far above the telescope. This being objectionable, as the space may not always allow such arrangement, I have now made a sliding connection between the two rods, there being placed a slide 37 on the rod 36, to which the rod 21 is fixed. This slide is by way of springs 37' given a certain frictional resistance, so that at the first part of the movement upward the incline the rod 36 will be carried along with the slide. On the back of the rod 36 is a pin 38, which when it hits the crosspiece 34 stops the further movement of the rod, whereupon the slide 37 will slide upward on the rod 36. The incline 50 is mounted on a parallel bar 51, as shown in Figs. 2 and 3, and on the rear bar is fixed a guide-rib 39, underneath which the pin 40, which forms the connection between the rod 21 and the slide 37, may pass, so that it is held in contact with the incline. Such contact is also insured by means of the spring 28 acting on an arm 29 on the axle of the pinion 31. The bar 51, on which the incline 50 is mounted, has a pivot at 52 and may be adjusted within certain limits by means of an eccentric or cam 53. The bar may be secured in the adjusted position by means of a screw 54 working in a slot 55 in the framework. The cam 53 is provided with a scale which indicates the tide. By these means it is possible in a very simple way to make the necessary corrections for tide.

56 and 57 are rollers, mounted, respectively, at the upper and the lower end of the bar or arm 51. 58 and 59 are strings, the ends of which are fixed to the pin 40 and passing over the said rollers 56 57 and a third roller 57' to a drum 60 61. This drum consists of two parts, of which one, 60, is fixed to the axle. The other, 61, is loose on the axle, but may be secured to the other part of the drum by means of a screw 62, which extends through a curved slot 63 in the drum part 60. The said strings are secured to the two drum parts. After they are secured the drum parts may be turned relatively to each other, so as to cause a tightening up of the strings. The axle 66 of the drum carries a worm-wheel 67, which meshes with a worm-wheel 68 on an axle 69, provided with a hand-wheel 70. When turning this hand-wheel, the drum will be turned, and the strings are so laid or wound on the drums that by such turning one string will be wound up, the other unwound on the drum. This will cause a moving up or down on the incline 50 of the slide 37.

The forward end of the axle 69 rests in a journal 71, which is vertically movable in guides 72 by means of a cam or excenter arm 73. A spring 74 holds the journal down. By lifting the axle the worm 68 will come out of engagement with the wheel 67, and the drum may then be turned by hand directly, whereby a more rapid adjustment is obtained. A similar arrangement is also provided for the horizontal adjustment-worm 9, above referred to. 80 is an electric battery which is mounted on the central post 6. This battery serves to furnish the necessary current to an electric lamp 81, provided for on the telescope to light the cross-wires of the ocular.

I claim—

1. In an orograph instrument, the combination with a telescope, a pointer, and means to simultaneously move the telescope around a horizontal axis and the pointer in a horizontal plane, of adjustable means to vary the ratio between the angular movement of the telescope and the rectilinear movement of the pointer.

2. In an orograph instrument, the combination with a telescope, a horizontally-movable pointer, and a link connection between the telescope and pointer adapted to simultaneously move the telescope around a horizontal axis and the pointer in a horizontal plane, of a guide for the connection, and means to adjust said guide, for the purpose specified.

3. In an orograph instrument, the combination with a telescope, a horizontally-movable pointer, a rod in operative connection with the telescope and a link connected with the pointer, of a sleeve connecting the rod and link, a guide for said rod, and means for moving the rod on the guide and for moving the sleeve on the rod, for the purpose specified.

4. In an orograph instrument, the combination with a pivoted telescope and a horizontally-movable pointer, of a rod operatively connected to the telescope, a link connected with the pointer, a sleeve connecting the rod and link, a guide for the rod, means for arresting the movement of the rod, and means for moving the rod along the guide and for moving the sleeve on the rod after its arrest, substantially as and for the purpose specified.

5. In an orograph instrument, the combination with a telescope, a movable pointer, and a link connection adapted to simultaneously move the telescope around a horizontal axis and the pointer in a horizontal plane, of a pivoted guide for said link connection and means for rotating the guide around its pivot, for the purpose specified.

6. In an orograph instrument, the combination with a telescope, a movable pointer and a link connection adapted to simultaneously move the telescope around a horizontal axis and the pointer in a horizontal plane, of a pivoted guide for the link connection, a cam for adjusting the guide, and means for locking the latter in its adjusted position, for the purpose specified.

7. In an orograph instrument, the combination with a telescope and a horizontally-movable pointer, of a rod in operative connection with the telescope, a link connected with the pointer, a sleeve movable on the rod and pivotally connected with the link, a guide for the rod, means for holding the rod on the guide, means to arrest the movement of the rod and means for moving the rod and for moving the sleeve on the rod after its arrest.

8. In an orograph instrument, the combination with a telescope, means to move the same around a vertical axis, mechanism to move it around a horizontal axis, a pointer, a link connection between the latter and the aforesaid mechanism, an inclined guide for said link connection and means to vary the position of the guide to compensate for variation in tide.

9. In an orograph instrument, the combination with a telescope, means to move the same around a vertical axis, mechanism to move it around a horizontal axis, a scale, a pointer movably mounted on the latter, a link connection of variable length between said pointer and mechanism, an inclined or curved guide serving to fix the angular position of the link connection, and means to vary the position of the guide so as to compensate for variation in tide.

10. An orograph instrument comprising a telescope, a frame, an index-slide, a horizontal guide for the latter, an angular guide, a link connected at one end with said slide and having its other end supported by the angular guide, a sleeve connected with the latter end of said link, a pinion mounted in the frame, a rod connected with the pinion and the sleeve, a toothed rack connected with the telescope and meshing with the pinion, a rotatable drum formed in two parts and mounted on the frame, cords on the drum connected with the slide and passing respectively around the lower and upper end of the guide, means for angularly adjusting the drum, and mechanism for rotating the latter.

In witness whereof I have hereunto set my hand in presence of two witnesses.

HANS GEORG JACOB STANG.

Witnesses:
  HENRY BORDEWICH,
  MICHAEL ALGER.